United States Patent
Louch

(10) Patent No.: US 8,319,795 B2
(45) Date of Patent: *Nov. 27, 2012

(54) METHODS OF MANIPULATING A SCREEN SPACE OF A DISPLAY DEVICE

(75) Inventor: John Louch, San Luis Obispo, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/268,186

(22) Filed: Oct. 7, 2011

(65) Prior Publication Data

US 2012/0030617 A1    Feb. 2, 2012

Related U.S. Application Data

(63) Continuation of application No. 12/568,627, filed on Sep. 28, 2009, now Pat. No. 8,040,360, which is a continuation of application No. 11/387,513, filed on Mar. 22, 2006, now Pat. No. 7,595,810.

(51) Int. Cl.
*G09G 5/00* (2006.01)
*G06F 3/048* (2006.01)

(52) U.S. Cl. ........ 345/629; 345/650; 715/788; 715/779; 715/759

(58) Field of Classification Search .................. 345/629; 715/778, 863

See application file for complete search history.

(56) References Cited

U.S. PATENT DOCUMENTS

| | | | |
|---|---|---|---|
| 6,810,521 B1 | 10/2004 | Gelgon et al. | |
| 7,426,697 B2 | 9/2008 | Holecek et al. | |
| 7,478,339 B2 | 1/2009 | Pettiross et al. | |
| 7,581,192 B2 | 8/2009 | Stabb et al. | |
| 7,595,810 B2 | 9/2009 | Louch | |
| 2002/0080154 A1* | 6/2002 | Matthews et al. | 345/700 |
| 2002/0085042 A1* | 7/2002 | Matthews et al. | 345/810 |
| 2002/0184610 A1 | 12/2002 | Chong et al. | |
| 2003/0189597 A1* | 10/2003 | Anderson et al. | 345/778 |
| 2004/0261037 A1 | 12/2004 | Ording et al. | |
| 2004/0263491 A1 | 12/2004 | Ishigaki | |
| 2005/0091615 A1* | 4/2005 | Suzuki | 715/863 |
| 2005/0149879 A1 | 7/2005 | Jobs et al. | |
| 2006/0048058 A1* | 3/2006 | O'Neal et al. | 715/730 |

(Continued)

OTHER PUBLICATIONS

Coleman, Dale et al., "The Macintosh Bible," 5 pages (cover page, title page and pp. 79-81 of Chapter 5), Copyright 1987, ISBN 0940235005, Goldstein & Blair, Berkeley, CA.

*Primary Examiner* — M Good Johnson
(74) *Attorney, Agent, or Firm* — Schwegman Lundberg & Woessner, P.A.

(57) ABSTRACT

Methods to manipulate a screen space of a display device are disclosed. A plurality of application windows of a plurality of applications are displayed on a screen space. At least a first application and a second application are executing to display a plurality of windows. A user interface of system level applications may be displayed. A selection of a single application mode is received. In response to the receiving of the selection of the single application mode, all the windows are removed automatically from the screen space, except for a first application window. At least the first and second applications continue being executed. The user interface of the system level applications may continue to be displayed. Next, a request to display a second application window is received. The second application window is displayed while the first application window is removed from the screen space.

24 Claims, 13 Drawing Sheets

U.S. PATENT DOCUMENTS

| | | |
|---|---|---|
| 2006/0085760 A1 * | 4/2006 | Anderson et al. ............ 715/778 |
| 2006/0123353 A1 | 6/2006 | Matthews et al. |
| 2006/0224991 A1 | 10/2006 | Stabb et al. |
| 2006/0248471 A1 | 11/2006 | Lindsay et al. |
| 2007/0016873 A1 | 1/2007 | Lindsay |
| 2007/0143702 A1 | 6/2007 | Maggi |
| 2007/0186176 A1 | 8/2007 | Godley |
| 2009/0150824 A1 | 6/2009 | Furuichi |

* cited by examiner

400

Displaying a plurality of windows on a screen space, wherein at least a first application and a second application are executing to display the plurality of windows
401

Receiving a selection of a single application mode
402

Removing automatically, in response to the selection, all the windows from the screen space, except one or more windows of the first application, wherein at least the first and the second application continue executing
403

Receiving a request to display one or more windows of a second application program
404

Displaying one or more windows of the second application program while removing the windows of the first application program from the screen space
405

FIG. 4

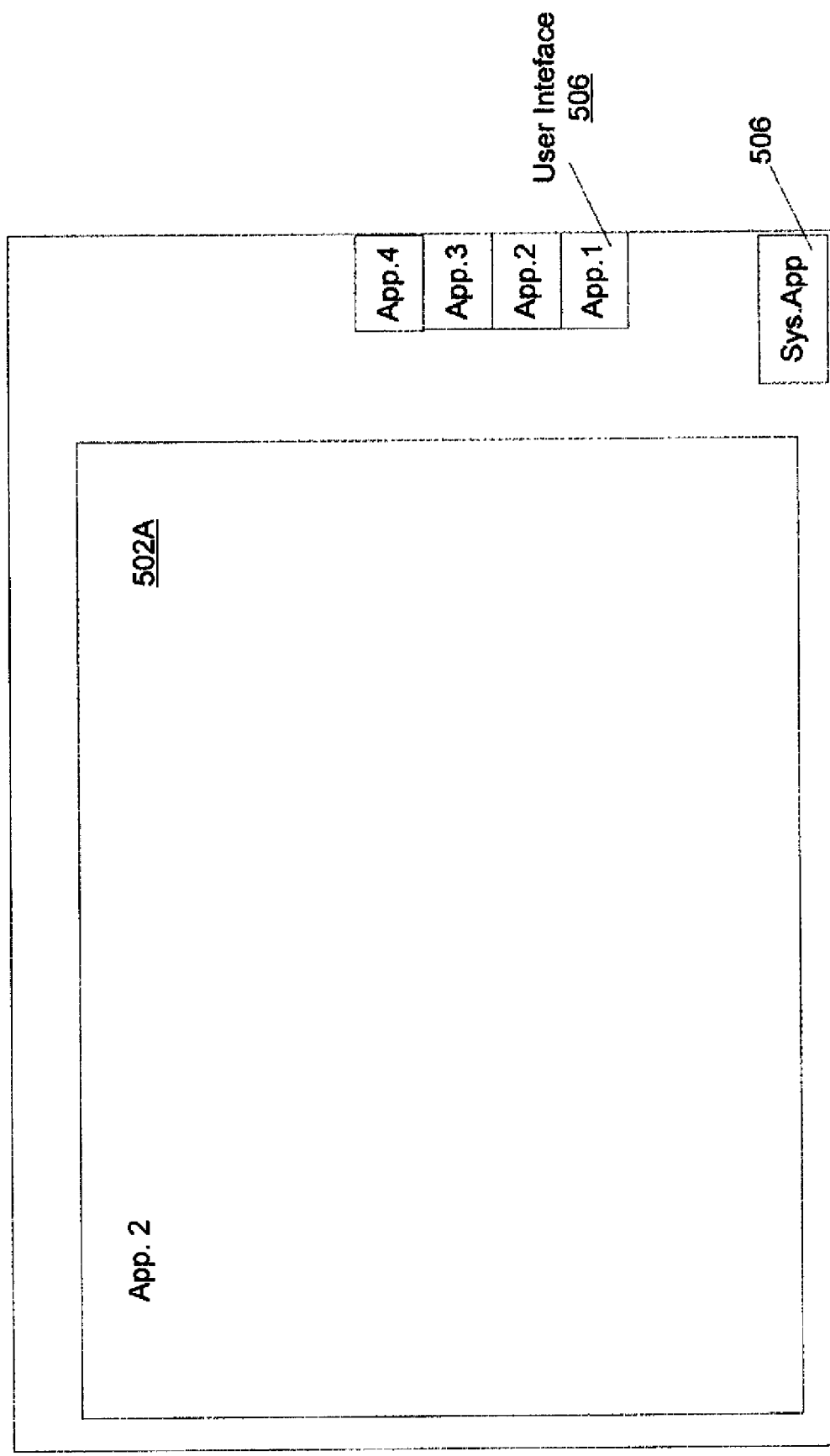

600

| Displaying one or more first user level application windows and one or more second user level application windows, and a first user interface of a system level application program, wherein one or more first user level application windows and one or more second user level application windows are displayed in a multi- application mode that includes concurrently displaying application windows of a plurality of executing user level application programs
601 |

| Switching from the multi- application mode to a single application mode, wherein switching is performed, e.g., by selecting a command to enter the single application mode
602 |

| Removing (automatically, in response to the switching to the single application mode) the second user level application windows while leaving the one or more first application windows displayed
603 |

| Continuing to display the first user interface ( e.g., a bar, or icon) of the system level application ( optionally)
604 |

| Receiving a request to display a window of the second user level application
605 |

| Displaying the window of the second user level application while removing the windows of the first user level applications
606 |

| Displaying a second user interface (e.g., a docking bar) to show user level applications, which windows have been removed from the screen space, and are executing. ( optionally)
607 |

FIG. 6

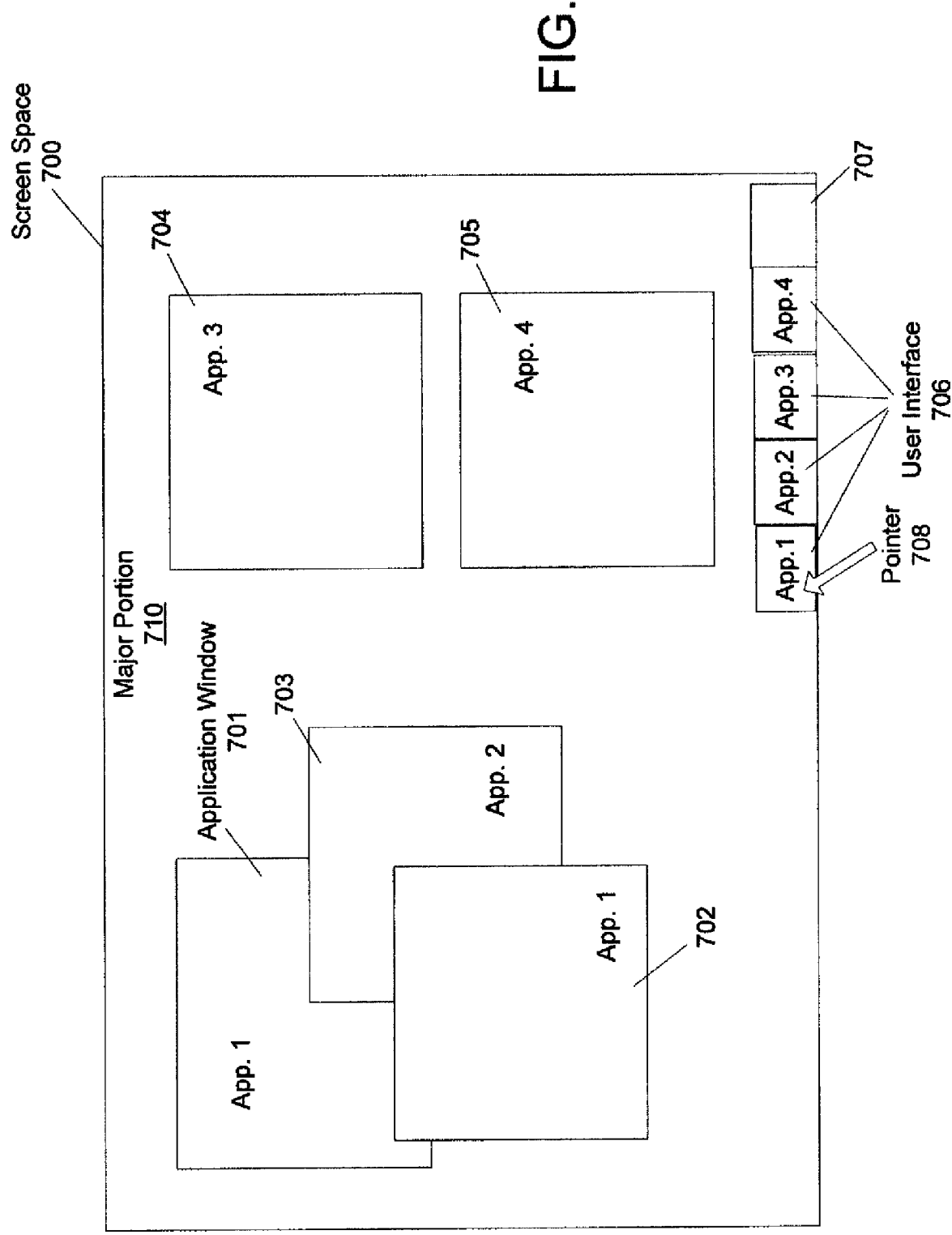

```
┌─────────────────────────────────────────────┐
│ Displaying multiple windows on a screen space, wherein │   800
│ each of the windows is controlled by a separate application │
│ and displaying a user interface of system level │
│ application(s) ( e.g., a dock), which shows system level │
│ applications │
│ 801 │
└─────────────────────────────────────────────┘
                        │
┌─────────────────────────────────────────────┐
│ Receiving a selection of a single application mode │
│ 802 │
└─────────────────────────────────────────────┘
                        │
┌─────────────────────────────────────────────┐
│ Automatically, in response to the selection, removing all the │
│ windows from the screen space, except a first application │
│ window │
│ 803 │
└─────────────────────────────────────────────┘
                        │
┌─────────────────────────────────────────────┐
│ Continuing to display the user interface ( e.g., a dock) of the │
│ system level applications │
│ (optionally) │
│ 804 │
└─────────────────────────────────────────────┘
                        │
┌─────────────────────────────────────────────┐
│ Displaying the user interface of user level applications, │
│ which windows are removed from the screen space, and are │
│ executing │
│ ( optionally) │
│ 805 │
└─────────────────────────────────────────────┘
                        │
┌─────────────────────────────────────────────┐
│ Receiving a request to display a second application window │
│ 806 │
└─────────────────────────────────────────────┘
                        │
┌─────────────────────────────────────────────┐
│ Displaying, in response to the receiving the request, the │
│ second application window on the screen space while │
│ removing the first application window from the screen │
│ space │
│ 807 │
└─────────────────────────────────────────────┘
```

FIG. 8

METHODS OF MANIPULATING A SCREEN SPACE OF A DISPLAY DEVICE

This application is a continuation of U.S. patent application Ser. No. 12/568,627, filed on Sep. 28, 2009 now U.S. Pat. No. 8,040,360, which is a continuation of U.S. patent application Ser. No. 11/387,513 filed on Mar. 22, 2006, entitled "Methods of Manipulating a Screen Space of a Display Device" now issued as U.S. Pat. No. 7,595,810.

FIELD

Embodiments of the invention relate to graphical user interfaces ("GUIs"). More particularly, embodiments of the invention relate to methods of manipulating a screen space in a display device.

BACKGROUND

Data processing systems, e.g., desktop computers, laptop computers, personal digital assistants, and the like, use display devices (e.g., computer monitors) to show objects such as text characters, and still and moving images on a screen. Graphical user interfaces are created for a user to interact with a data processing system using various images, e.g., icons, windows, and other objects. Icons are small pictures shown on a screen of a display device that may represent programs, or files or other items. For example, by moving a pointer to an icon and pressing a mouse button, the user executes a command, opens a file represented by the icon into a window, or moves the icon around the display screen. Typically, a user operates an application executed by a processor through one or more windows displayed on the screen of the display device.

With the increased performance of data processing systems, more and more applications can be executed by a processor at the same time. Consequently, more and more application windows of various applications may be displayed on the screen of the display device at the same time. As such, various application windows have to share the same screen space of the display device. Typically, the user switches between application windows displayed on the screen of the display device to communicate with the applications. Sharing the screen space by many application windows causes clutter on the screen space. Therefore, the quest for larger display devices and/or better use of the screen real estate becomes important. This is especially important for data processing systems having relatively small screens, e.g., laptop computers and personal digital assistants (PDAs).

FIG. 1 illustrates a screen space 100 of a display device of a computer in a multi-application mode environment. In the multi-application mode, a user may divide the screen space 100 into different areas using windows which may overlap each other. The desktop 110 is the area on the display screen 100 where icons 111 are typically displayed. In each window, the user may run a different program or display a different file. As shown in FIG. 1, a major screen space 100 is shared by an application window 101 and an application window 102. As shown in FIG. 1, application window 101 is controlled by Microsoft Excel, and application window 102 is controlled by Microsoft Word. Microsoft Excel and Microsoft Word are produced by Microsoft, Inc. located in Redmond, Wash. As shown in FIG. 1, icons 103, 104, and 105 at a bottom of the screen space 100 represent applications that are currently executed by the computer. When the user switches from Microsoft Excel to Microsoft Word, the application window 102 moves to the front of screen space 100, and application window 101 moves to the back of screen space 100, behind application window 102, as shown in FIG. 1. That is, all application windows remain occupying screen space 100 when the user switches between applications. Displaying multiple application windows on a display device causes significant clutter of the screen space. Typically, to reduce the clutter of screen space 100 the user minimizes application window 101 by positioning the pointer over minimizing window icon 106 and clicking (e.g. pressing and releasing) the mouse's button.

FIG. 2 illustrates another screen space 200 of a display device of a computer in a multi-application mode environment. This environment shown in FIG. 2 is provided by the Macintosh operating system known as Mac OS 9. As shown in FIG. 2, screen space 200 is occupied by application window 201 controlled by Microsoft Word, application window 202 controlled by Microsoft Outlook, and application window 203 controlled by FileMaker Pro produced by FileMaker, Inc., located in Santa Clara, Calif. A user may open a menu 204 and choose a program to operate, e.g., a Microsoft Word, from the menu 204 as shown in FIG. 2. The user may point the pointer cursor over the option "Hide Others" and click a mouse button to hide application window 202 and application window 203, and to display only application window 201 (and other windows) controlled by Microsoft Word. Typically, when the user needs to switch to another application, e.g., to Microsoft Outlook, the user positions the pointer over Microsoft Outlook option of menu 204 and clicks the mouse to bring application window 202 to screen space 200. In response to this switch, application window 202 is displayed with application window 201 to share screen space 200. Further, when the user needs to use yet another program, e.g., FileMaker Pro, the user positions the pointer over FileMaker Pro option of menu 204 and clicks the mouse. In response, application window 203 is brought back to share screen space 200 with application window 201 and application window 203. That is, in the multi-application mode, each time the user needs to use another application, another application window is added up to existing application windows to share screen space 200 and this causes significant screen clutter. To reduce the screen clutter in the multi-application mode, the user needs to perform numerous actions, including many cursor manipulations, to open menu 204, select "Hide Others" option on menu 204 each time when another application window is added to the screen. These many cursor manipulations are very time consuming and inconvenient. The clutter of the screen space that occurs in the multi-application mode environment is not only very inconvenient. In the multi-application mode, the screen clutter and necessity of going back and forth between different applications significantly increases the probability of errors. For example, a user can accidentally click onto a wrong application window to operate a wrong application.

Another example of a prior art user interface is the "Switcher" program developed by Andy Hertzfeld for the Macintosh operating system. The Switcher program allowed a user to switch from user application to user application; however, in this prior art system, only a window controlled by a single application can be displayed and receive input at any one time.

SUMMARY OF THE DESCRIPTION

Methods to manipulate a screen space of a display device in a data processing system are disclosed. A plurality of application windows of a plurality of applications are displayed on the screen space of the display device while in a multiple application mode Additionally, a user interface of system level applications, e.g., a dock or menu bar, may be displayed on the screen space of the display device. At least a first application and a second application are executed by a processor of the data processing system to display the plurality of application windows. Next, a selection of a single application ("Single App") mode is received (thereby causing a switch from multiple application mode to single application mode). The single application mode includes controlling a major portion of the screen space by one application which is usually a user level application program. That is, one or more windows of only one application executed by the processor are displayed at a time. Further, in response to the receiving of the selection of the single application mode, all of the windows are automatically removed or animated away from the screen space of the display device, except for one or more windows of the first application. The second application may continue to be executed by the processor after the removing of all of the windows from the screen space, except for one or more windows of the first application. A user interface, e.g., a dock and/or menu bar, may be displayed to show applications, whose windows have been removed from the screen space. The user interface of the system level applications (e.g. dock and/or menu bar) may continue to be displayed on the screen space. In one embodiment, other one or more applications are marked in such a way that they continue to be displayed in the single application mode. Next, a request to display one or more second application windows of a second application is received. The second application window is displayed while the first application windows are automatically removed from the screen space in response to the request. The first application may continue to be executed by the processor after the removing of the first application windows from the screen space of the display device.

In another embodiment, a plurality of application windows are displayed in a screen space. At least a first set of applications (e.g., user level applications) is marked to be displayed in a Single App mode. In this embodiment, Single App mode may be characterized as a "selected applications mode". At least a second set of applications (e.g., user level applications) is marked to be displayed in a Single App mode. Next, a selection of a Single App mode is received. In response to the selection, all the windows are automatically removed from the screen space, except for one or more windows of the first set of applications. Next, a request to display the windows of the second set of applications is received while in the Single App mode. In response to the request, one or more windows of the second set of application are displayed while removing all the windows of the first set of applications.

In one embodiment, one or more first user level application windows and one or more second user level application windows, and a first user interface of a system level application, e.g., a dock and/or menu bar, are displayed on a screen space of a display device of a data processing system. The first user level application windows are controlled by a first user level application, and the second user level application windows are controlled by a second user level application. The first user level application and the second user level application are executed by at least one processor of a data processing system. One or more first user level application windows and one or more second user level application windows are displayed in a multi-application mode environment. The multi-application mode environment includes displaying application windows of the plurality of executing applications on the screen space of the display device concurrently. Next, a selection of the single application mode is received from a user. In response to this selection of the user, the multi-application mode environment is switched to a single application mode environment. The single application mode includes displaying one or more windows of only one application (usually a user level application) at a time. Next, in response to the switching from the multi-application mode environment to the single application mode environment, the second user level application windows are removed from the screen space while one or more first user level application windows are displayed. The second user level application, whose windows have been removed from the screen space, may continue to be executed by the processor. The user interface of the system level applications continues to be displayed on the screen space of the display device in the single application mode. Further, a request to display a window of the second user application is received. The window of the second user level application is automatically displayed in response to the request, while the windows of the first user level application are automatically removed from the screen space in response to the request to display the window of the second user application. In one embodiment, another user interface, e.g., a dock or menu bar, is displayed to show user level applications, which windows have been removed from the screen space, and that are executing.

BRIEF DESCRIPTION OF THE DRAWINGS

The present invention is illustrated by way of example and not limitation in the figures of the accompanying drawings in which like references indicate similar elements.

FIG. 4 is a flowchart of one embodiment of a method to manipulate application windows on a screen space of a display device in a data processing system.

FIG. 5C shows one embodiment of a screen space after an application window of another application has been displayed in a single application mode.

FIG. 6 shows one embodiment of a method of switching from a multi-application mode to a single application mode.

FIG. 7A shows another embodiment of a screen space of a display device of a data processing system in a multi-application mode.

FIG. 8 shows one embodiment of a method of manipulating a screen space of a display device.

DETAILED DESCRIPTION

The subject invention will be described with references to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2006.

Methods of manipulating application windows on a screen space of a display device in a data processing system and a system having a computer readable medium containing a program code for manipulating application windows on a screen space of a display device are described below. Other methods and other features are also described.

Figure 1:
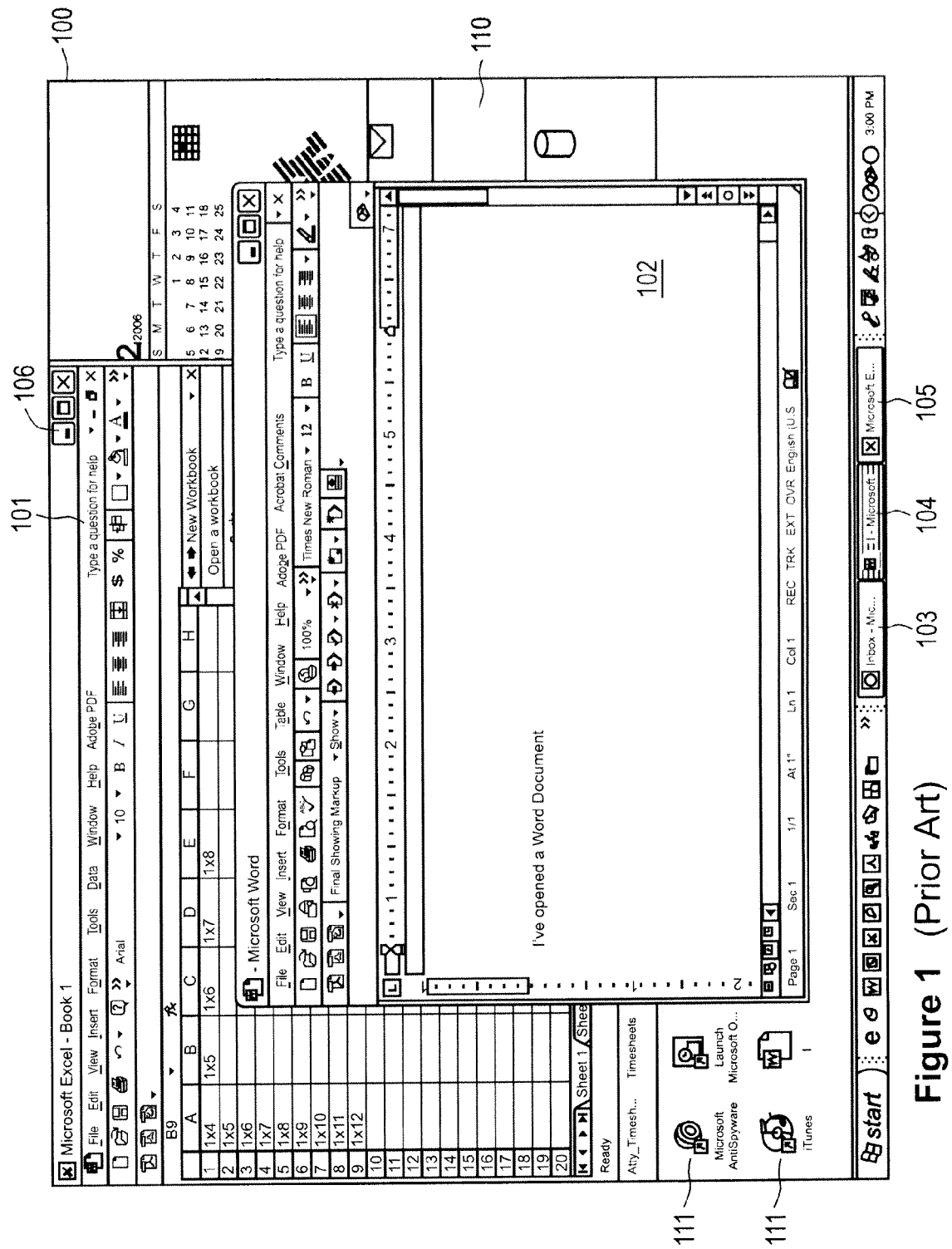
FIG. 1 illustrates a screen space of a display device of a computer in a multi-application mode environment.
Figure 2:
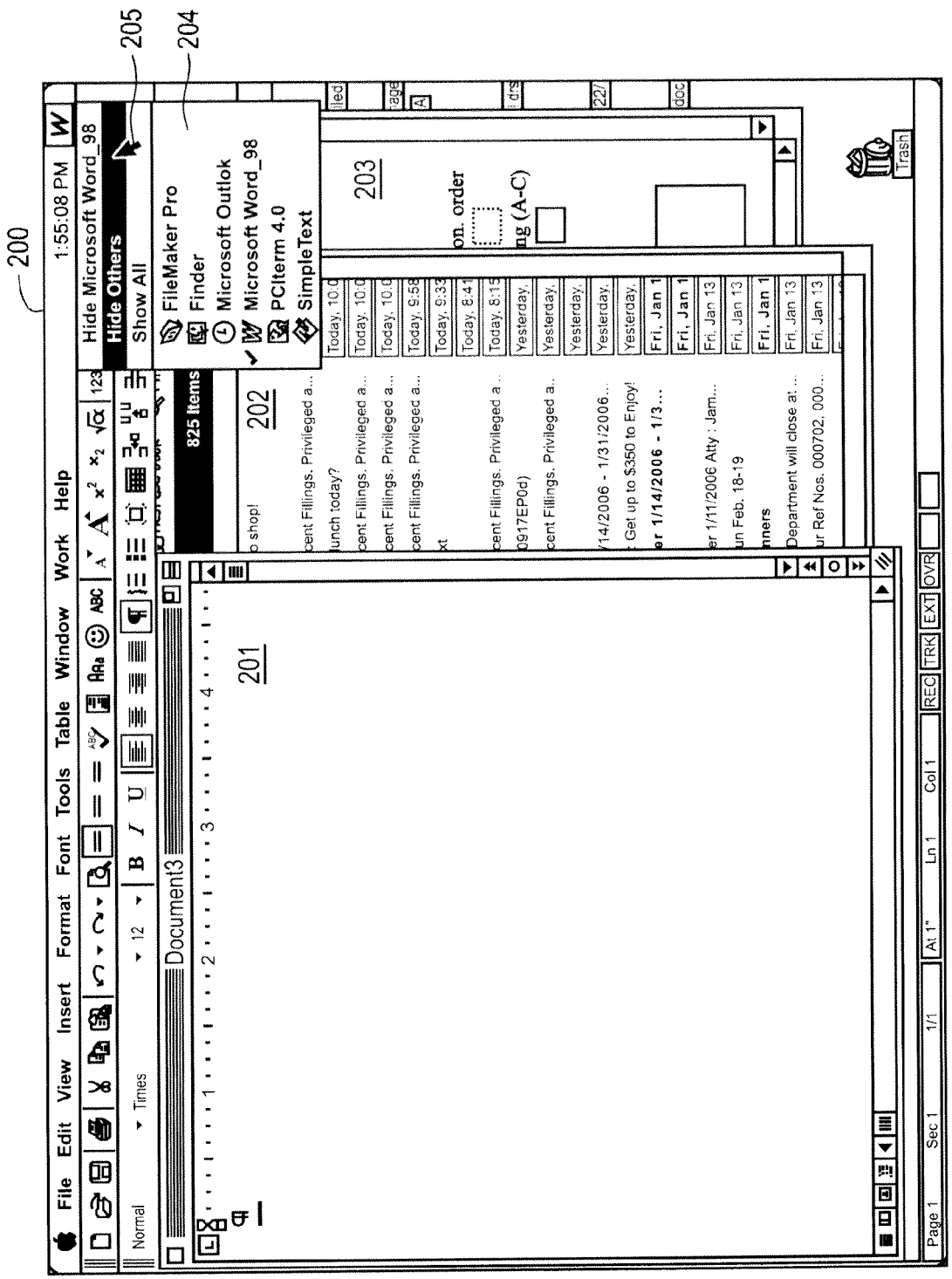
FIG. 2 illustrates another screen space of a display device of a computer in a multi-application mode environment.
Figure 3:
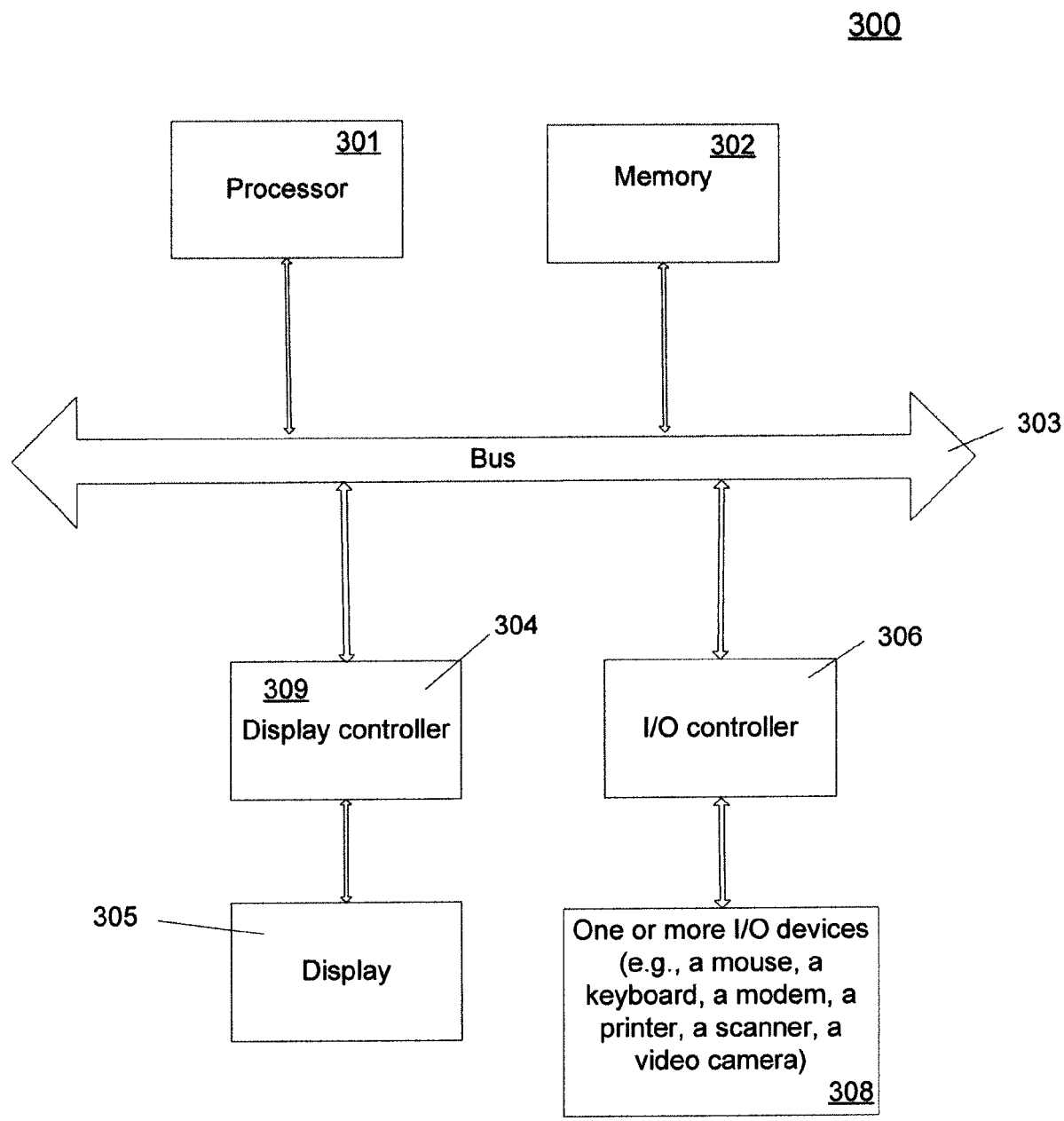
FIG. 3 shows a block diagram of one embodiment of a data processing system that performs manipulating application windows on a screen space.

FIG. 3 shows a block diagram of one embodiment of a data processing system 300 that performs manipulating application windows on a screen space. System 300 may be a general purpose computer system or a special purpose data processing system or a PDA or a cellular telephone or a media player. System 300 includes a processor 301 coupled to a memory 302 using a bus 303. In one embodiment, memory 302 may be a magnetic disk, an optical disk, a flash memory chip, a hard disk, a dynamic random access memory ("DRAM"), a battery backed memory, or any combination thereof. In one embodiment, the memory 302 may include a portable disk, such as a CD-ROM, a DVD, or a floppy disk. Processor 301 executes the software written onto the memory 302 to perform the methods of manipulating application windows on a screen space as described below. As shown in FIG. 3, processor 301 and memory 302 are coupled through bus 303 to an input/output ("I/O") controller 306 and to a display controller 304. As shown in FIG. 3, I/O controller 306 is coupled to one or more input/output devices 308, e.g., a mouse or other cursor control device, a keyboard, a modem, a printer, and a video camera to provide communication with a user. As shown in FIG. 3, a display controller 304 is coupled to a display device 305 to display, for example, one or more application windows, wherein the methods described below, are performed. Typically, a window is an enclosed, rectangular area on the screen space which can be moved around the screen and can be caused to appear and to be removed by a command from the user. Within different windows, a user can run different programs or display different data. Typically, an application receives a user input through the application window. The window can be a logical view of a file. By moving contents within the window, a user can view different portions of the file. The windows are described in further detail below. Further attributes of at least certain types of windows include the ability to be minimized (e.g. be reduced to the size of an icon), to be resized, to scroll the contents within the window. In one embodiment, display controller 304 includes a video adapter (e.g., video card, video board, video display board, graphics card, and graphics adapter) to produce the visual output from a data processing system. In one embodiment, display controller 304 includes a video adapter that contains a memory 309, e.g., a frame buffer, for holding texts and graphics sent to display device 305 for display. Software that includes programs and data to perform methods of manipulating application windows on a screen space as described below with respect to FIGS. 4-8, is written onto memory 302, memory 309, or both. Further, the video adapter of display controller 304 relays the information received from the programs and applications running on the data processing system to display device 305 that allows a user to view the information and images on a screen of the display device 305. In one embodiment, display controller 304 includes a video adapter that has a graphics coprocessor (graphics accelerator), for performing graphics calculations. The graphics accelerator may have memory 309 that may be faster than memory 302. The amount of memory determines how much resolution and how many colors can be displayed. Memory 302 and/or memory 309 may be dynamic random access memory (DRAM), or video RAM, which enables both the video circuitry and the processor to simultaneously access the memory. In one embodiment, display controller 304 having graphics accelerator (not shown) may be coupled to memory 302 through a video bus e.g., PCI or Accelerated Graphics Port (AGP).

Generally, software may be divided into two general classes: systems software and applications software. Systems software ("system level application") includes low level programs that interact with the computer system and the user at a basic level. This includes operating systems, compilers, utilities for managing computer resources, and other programs that may affect the data processing system. Applications software includes one or more programs designed for users of the data processing system ("user level applications"). For example, applications software may be database programs, word processors, spreadsheet programs, web browsers, graphics creation programs, and any other user document based applications. Figuratively speaking, applications software are high level programs that run on top of systems software because it is unable to run without the operating system and system utilities. In one exemplary embodiment, the user level applications can be run in either single application mode or multiple application mode while the system level application s (e.g. Operating System Kernel, file system software, dock software, etc.) normally run in multiple application mode only, although in an alternative embodiment, all applications having a user interface (e.g., displayed windows), including certain system level applications, may be capable of running in either mode. The contents of the screen space are controlled by the selection of the mode. It will be appreciated that the contents of the screen space are defined by the contents of the frame buffer which refreshes the screen space on the display device. In multiple application mode, several different user level applications can cause the display of several different windows controlled by those several different user level applications. For example, a first user level application (e.g., email software), a second user level application (e.g., word processing software), and a third uses level application (e.g. a web browser) can cause the display of several different windows (e.g. six windows, two for each of the three user level applications) concurrently on the screen space. In single application mode, the windows of only one user level application (or a selected subset of those windows) are displayed concurrently in the screen space while the other user level applications continue to run (but their windows are not displayed), in one exemplary embodiment, small, iconic-like, active representations of those windows which are not displayed may be displayed in the clock or other system level user interface. When a user switches between applications in the single application mode, the windows of the user level application which were displayed before the switch are automatically closed (e.g. removed from the desktop or main display portion) and the windows of the selected user level application are displayed, all in response to the command for the switch; for example, when switching between a first user level application currently having two windows being displayed to a second user level application, the two windows of the first user level application will be automatically closed and windows of the second user level application will be displayed all in response to a single user command which requests the switch.

A window has a variety of characteristics or features including one or more of the following: (a) a moveable and resizable container having borders; (b) scroll controls, such as scroll arrows, to scroll the contents of the window; (c) the window can receive user input such as text entry (e.g. through typing or copying and pasting of text) or cursor entry events (e.g. selection of buttons or commands within a window) or dragging and dropping of an object.

FIG. 4 is a flowchart of one embodiment of a method 400 to manipulate application windows on a screen space of a display device in a data processing system. The method begins with operation 401 that involves displaying, in a multiple application mode, a plurality of windows on a screen space, wherein at least a first application and a second application are executing to display the plurality of windows.

Figure 5A:
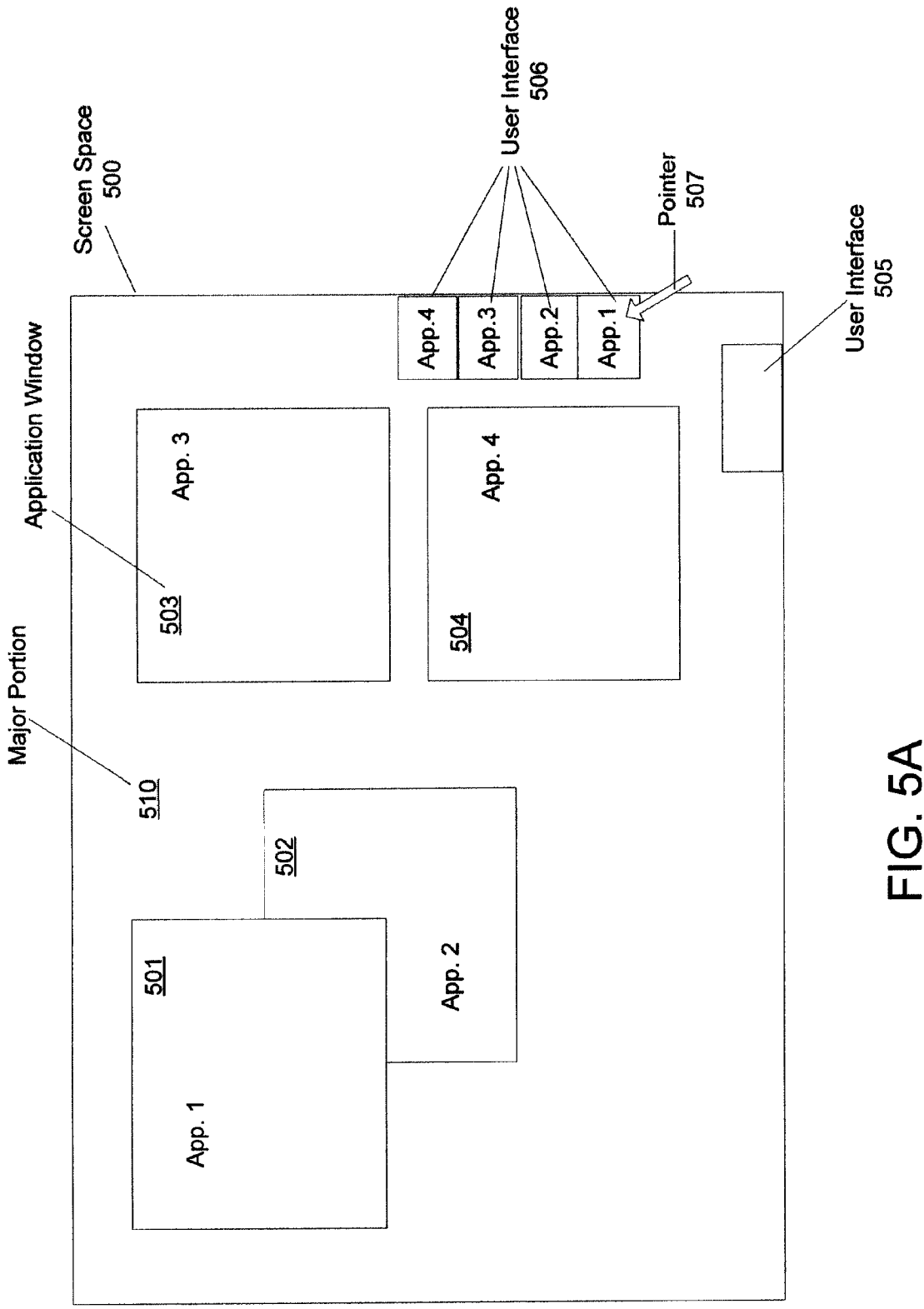
FIG. 5A shows one embodiment of a screen space of a display device of a data processing system in a multi-application mode environment.

FIG. 5A shows one embodiment of a screen space 500 of a display device of a data processing system in a multi-application mode environment. As shown in FIG. 5A, screen space 500 is occupied by application window 501 controlled by application App.1, application window 502 controlled by application App.2, application window 503 controlled by application App.3, and application window 504 controlled by application App. 4. As shown in FIG. 5A, a major portion 510 of screen space 500 is controlled by multiple applications App.1-App.4. In one embodiment, major portion 510 is defined as a portion of screen space 500 that can display one or more application windows of separate applications App.1-App.4. In one embodiment, major portion 510 occupies from about 80% to about 99% of screen space 500. In one embodiment, App.1-App.4 are executed by processor 301 of data processing system 300, to display application windows 501-504 concurrently on screen space 500, as shown in FIG. 5A. In one embodiment, text and graphics to display application windows 501-504 on display device 305 are contained in a frame buffer (not shown) of memory 309. In one embodiment, applications App.1-App.4 are user level applications. In another embodiment, applications App.1-App.4 include user level applications and system level applications. In one embodiment, screen space 500 includes a user interface 505, e.g., an icon, a bar, a command tab interface, a dashboard, a taskbar, a menu bar, a display region that presents an information, e.g., a stock ticker, or any combination thereof, as shown in FIG. 5A. In one embodiment, user interface 505, e.g., a bar, is used to show system level applications. In one embodiment, user interface 505 may be animated, e.g., may be floating over screen space 500. System level applications may provide the information on the status of the computer system, e.g., usage of the battery, status of the computer hardware (e.g., an amount of used and available memory), needed updates for the operation system, time and date information, and the like. In one embodiment, screen space 500 includes a user interface 506 e.g., a docking bar ("dock"), as in Mac OS X produced by Apple Computer, Inc., located in Cupertino, Calif. to display frequently used user level applications, user level applications that are currently executed by the processor of the data processing system, or both. In one embodiment, user interface 505 that displays a system level application and user interface 506 that displays user level applications may be the same user interface, e.g., a docking bar. In another embodiment, user interface 505 and user interface 506 are different interfaces.

Referring back to FIG. 4, method 400 continues with operation 402 of receiving a selection of a single application ("Single App") mode. A user may select this mode by selecting a command from a menu such as a pull down menu or a pop-up menu. The single application mode involves controlling a major portion of the screen space by a single application to display one or more application windows of the single application. That is, in the single application mode environment, only one application and its one or more windows are displayed on a screen space at a time. Referring back to FIG. 5A, in one embodiment, the selection of the single application mode is performed by positioning a pointer 507 over a text or image representation (e.g., an icon) of a desired application on the user interface 506 that shows applications that are currently executed by the processor, as shown in FIG. 5, and selecting a command from a contextual menu. In another embodiment, the selection of the single application mode is performed by positioning pointer 507 over a desired application window of application windows 501-504, and selecting a command from a contextual menu. In alternate embodiments, the selection of the single application mode may be performed by a user using any input device, e.g., a keyboard, mouse, microphone, and the like. In one embodiment, selection of the single application mode is performed by selecting a command to enter the single application mode, as described below. In a typical embodiment of the invention, a switch between multiple application mode and single application mode (and vice versa) does not involve a change from one operating system to another operating system; in other words, the same operating system (e.g. Macintosh OS X) is used for both modes.

Next, referring back to FIG. 4, operation 403 involves removing automatically, in response to receiving the selection of the single application mode, all the windows from the screen space, except for one or more application windows of the first application, as shown in FIG. 4. In one embodiment, automatically removing all the windows, except for one or more application windows of the first application, is performed by executing the command to enter the single application mode. In one embodiment, in response to positioning a pointer over a dock selecting a command for single application mode from a contextual menu, a command is executed to automatically remove all the windows.

Figure 5B:
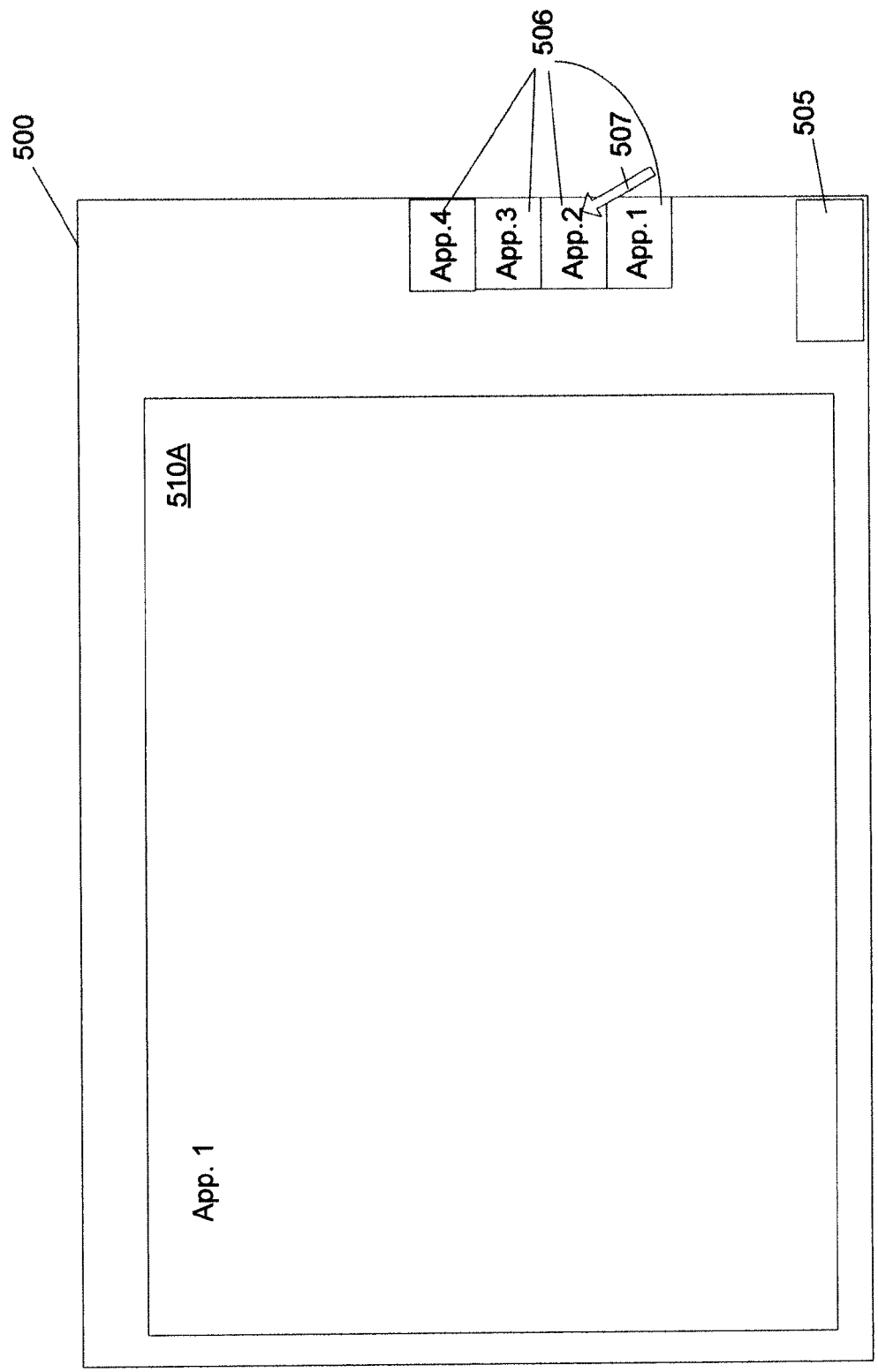
FIG. 5B shows one embodiment of a screen space of a display device after all the windows, except one or more application windows of one application, have been automatically removed from the screen space.

FIG. 5B shows one embodiment of screen space 500 of the display device of the data processing system after all the windows, except for one or more application windows of one application, have been automatically removed from screen space 500 in response to receiving the selection of the single application mode. As shown in FIG. 5B, window 510A is controlled by a single application App. 1 and occupies most of the screen space. As shown in FIG. 5B, application window 501A is displayed in a single application ("Single App") mode environment. Application windows 502-504 of applications App.2-App.4 have been automatically removed, in response to the selection of a single application mode from screen space 500 without a user's intervention (other than the selection of this mode), while application window of application App.1 continues to be displayed on screen space 500. In one embodiment, after application windows 502-504 have been automatically removed from screen space 500, the content of window 510A remains in the frame buffer while the contents to display application windows 502-504 on display device 305 are no longer contained in the frame. As shown in FIG. 5B, after removing application windows 502-504, screen space 500 has been de-cluttered. In one embodiment, application windows 502-504 are removed using an animation, e.g., application windows 502-504 may be flown off screen space 500 to a smaller location on screen space 500, e.g., to user interface 506. In one embodiment, user interface 505 and user interface 506 are continued to be displayed after removing application windows 502-504, as shown in FIG. 5B. In one embodiment, Applications App.2-App.4, which application windows 502-504 have been removed from screen space 500, continue to be executed by the processor of the data processing system and are identified by text App.2, App.3, and App. 4, or respective icons, on user interface 506, as shown in FIG. 5B.

Further, referring back to FIG. 4, method 400 continues with operation 404 that involves receiving a request to display one or more windows of the second application. In one embodiment, the request to display one or more windows of the second application is performed by positioning pointer 507 over an icon App.2 on user interface 506 and selecting that icon (e.g. by pressing and releasing a mouse's button), as shown in FIG. 5B. In alternate embodiments, the request to display one or more windows of the second application may be performed through a keyboard, a microphone, or any other input device of the data processing system.

Next, operation 405 is performed in a single application mode, and operation 405 involves displaying one or more windows of the second application while automatically removing the first application windows from the screen space. FIG. 5C shows one embodiment of screen space 500 after application window 502A of App. 2 has been displayed, while automatically, without a user's intervention (other than the selection of the second application), removing application window 510A of App. 1. As shown in FIG. 5C, application window 502A is displayed in a Single App. mode environment. That is, a window 502A of FIG. 5C is controlled by App. 2. Application window 510A is removed from screen space 500, such that application window 502A replaces application window 510A on screen space 500. In a single application mode, at any point of time only a single application may control the major portion of screen space 500. In one embodiment, after application window 510A has been removed from screen space 500, the content of window 502A remains in the frame buffer while the content of window 510A is no longer contained in the frame buffer. In one embodiment, user interface 505 and user interface 506 continue to be displayed after removing application window 510A while displaying application window 502A, as shown in FIG. 5C. In one embodiment, Application App.1, which application window 510A has been removed from screen space 500 and replaced by application window 502A, continues to be executed by the processor of the data processing system and is identified by text App.1, or an icon, on user interface 506, as shown in FIG. 5B. Displaying application windows on screen space 500 in multi-application mode or a single application mode is controlled by a user and the user may switch between a multi-application mode and a single application mode any time in at least certain embodiments.

FIG. 6 shows one embodiment of a method 600 of switching from a multi-application mode to a single application mode. Method 600 begins with operation 601 of displaying one or more first user level application windows and one or more second user level application windows, and a user interface of system level application(s), wherein the one or more first user level application windows and the one or more second user level application windows are displayed in a multi-application mode that includes displaying application windows of a plurality of executing user level applications concurrently, as described above with respect to FIG. 5A.

Next, operation 602 is performed that involves switching from the multi-application mode to a single application mode. In one embodiment, switching from the multi-application mode to the single application mode is performed in response to the selection of the single application mode, as described above. In one embodiment, switching from multi-application mode to the single application mode is performed by selecting a command to enter the single application mode, which will switch from the multi-application mode to the single application mode.

Method 600 continues with operation 603 that involves removing automatically in response to the switch to single application mode, without a user's intervention, the second user level application windows while leaving one or more first user level application windows displayed. Removing the second user level application window is performed in response to switching to the single application mode. Next, operation 604 involves continuing to display the user interface of the system level application(s). The user interface of the system level application is continued to be displayed in a single application mode, as described above. The user interface of the system level application may be an icon, a bar, a dock, a command tab interface, a dashboard, a taskbar, a menu bar, and the like. At operation 605, a request to display a window of the second user level application is received. The request is received during controlling a major portion of a screen space by a single application, as described above with respect to FIGS. 4 and 5B. Next, method continues with operation 606 that involves displaying the window of the second user level application while removing the windows of the first user level application. Displaying the window of the second user level application while the windows of first user application are removed is performed in a single application mode, as described above in response to a single command to select the second user level application. In one embodiment, the windows of the first user level application are pushed off the screen space, and the window of the second user level application is displayed on the screen replacing the first user level application window. In one embodiment, the first user application, whose application window has been removed from the screen space, continues to be executed by the processor. Next, operation 607 involves displaying a second user interface (e.g. another instance of a dock) to show a user level application that is executing and has its windows removed from the screen space. In alternate embodiments, the second user interface may be an icon, a text, or a bar, as described above. The dock may display a "live", updated representation of the output of the user level application which has had its window removed.

FIG. 7A shows another embodiment of screen space 700 of a display device of a data processing system in a multi-application mode. As shown in FIG. 7A, screen space 700 is occupied by application windows 701 and 702 controlled by application App.1, application window 703 controlled by application App.2, application window 704 controlled by application App.3, and application window 705 controlled by application App. 4. As shown in FIG. 7A, a major portion 710 of screen space 700 is controlled by multiple applications App.1-App.4 In one embodiment, major portion 710 occupies from about 80% to about 99% of screen space 700. In one embodiment, App.1-App.4 are executed by processor 301 of data processing system 300 shown in FIG. 3, to display application windows 701-705 concurrently on screen space 700, as shown in FIG. 7A. In one embodiment, applications App.1-App.4 are user level applications. In another embodiment, applications App.1-App.4 include user level applications and system level applications which have windows for a user interface. In one embodiment, screen space 700 includes a user interface 707 provided by one or more system level applications and this user interface may be, for example, an icon, a bar, a command tab interface, a dashboard, a taskbar, a dock, a menu bar, a region that presents an information, e.g., a stock ticker, or any combination thereof, as shown in FIG. 7A. In one embodiment, user interface 707, e.g., a system bar is used to show system level applications. In one embodiment, user interface 707 may be animated, e.g., may be floating over screen space 700. In one embodiment, screen space 700 includes a user interface 706 which may be a dock to display frequently used user level applications, user level applications that are currently executed by the processor of the data processing system, or both. In one embodiment, the user interface 707 that displays a system level application and the user interface 706 that displays user level applications may be the same user interface, e.g., the same dock. In another embodiment, user interface 707 and user interface 706 are different interfaces.

In one embodiment, a pointer 708 is positioned over an icon of a desired application on user interface 506 that shows applications that are currently executed by the processor, to select the single application mode, as shown in FIG. 7A. In alternate embodiments, the selection of the single application mode may be performed by a user using any input device, e.g., a keyboard, mouse, microphone, and the like to indicate this selection. In one embodiment, selection of the single application mode is performed by selecting a command to enter the single application mode, as described above.

Figure 7B:
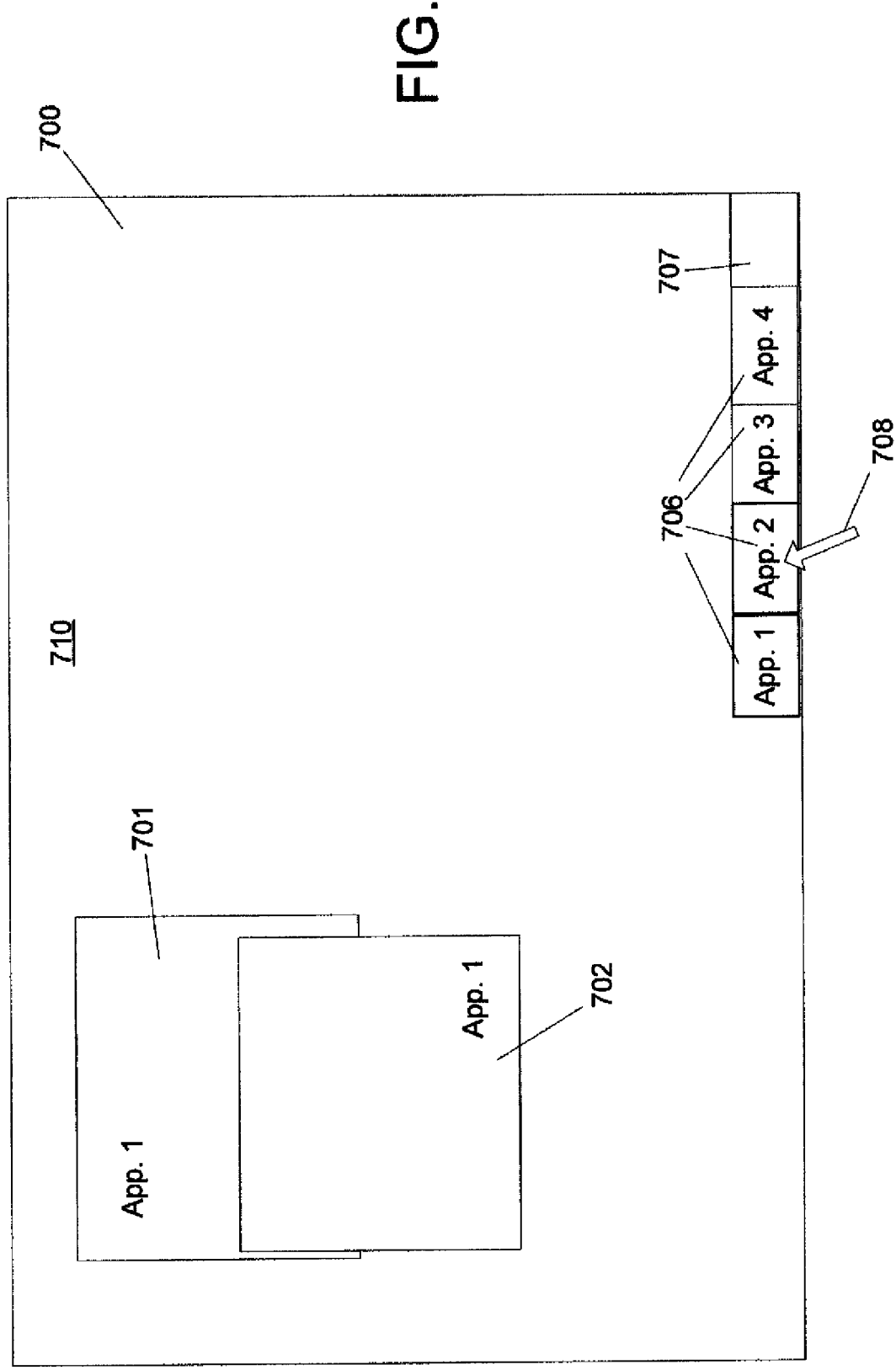
FIG. 7B shows another embodiment of a screen space of a display device of a data processing system after all the windows, except application windows of one application, have been automatically removed from a screen space.

FIG. 7B shows another embodiment of screen space 700 of the display device of the data processing system after all the windows, except application windows of one application, have been automatically removed from screen space 700 after receiving the selection of the single application mode. As shown in FIG. 7B, major portion 710 of screen space 700 is controlled by a single application App. 1. As shown in FIG. 7B, application window 701 and application window 702 of App.1 are displayed in a single application ("Single App") mode environment. Application windows 703-705 of applications App.2-App.4 have been automatically removed from screen space 700 without a user's intervention (except for the selection of a single application mode by the user), while application windows 701 and 702 of application App.1 continue to be displayed on screen space 700. As shown in FIG. 7B, after removing application windows 703-705, screen space 700 has been de-cluttered. In one embodiment, application windows 703-705 are removed using an animation, as described above. In one embodiment, user interface 706 and user interface 707 continue to be displayed after removing application windows 703-705, as shown in FIG. 7B. In one embodiment, Applications App.2-App.4, which application windows 703-705 have been removed from screen space 500, continue to be executed by the processor 300 of the data processing system and are identified by text App.2, App.3, and App. 4, or respective icons, on user interface 706, as shown in FIG. 7B.

In one embodiment, as shown in FIG. 7B, pointer 708 is positioned over an icon App.2 on user interface 706 to select for display one or more application windows of App.2 on screen space 700 in a single application mode. In other words, a user can switch from App. 1 to App. 2 in single application mode by selecting the icon App. 2 on the user interface 706, thereby causing the removal of all displayed windows of App. 1 and causing the display of all windows of App. 2 (or at least a subset of the windows of App. 2), all happening in response to a single user command to perform the switch. In alternative embodiments, other input devices (such as, e.g., a keyboard, a microphone, or any other input device of the data processing system) may be used to cause a switch from one application to another application while in single application mode.

Figure 7C:
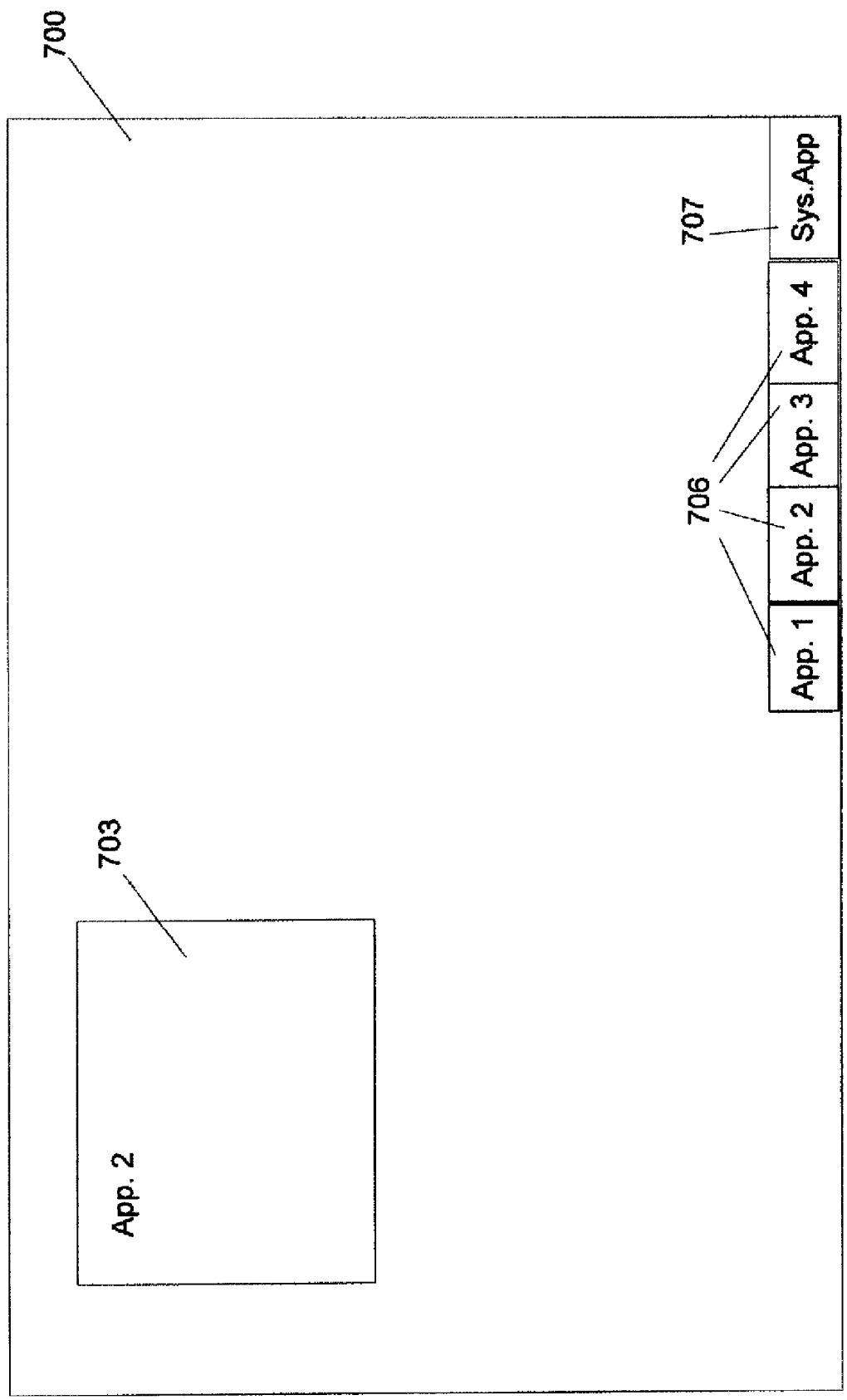
FIG. 7C shows another embodiment of a screen space after an application window of another application has been displayed, while automatically removing application windows of the first application.

FIG. 7C shows another embodiment of screen space 700 after application window 703 of App. 2 has been displayed in response to a switch from App. 1 to App. 2, while automatically, in response to the switch, removing application windows 701 and 702 of App. 1. As shown in FIG. 7C, application window 703 is displayed in a Single App. mode environment. That is, major portion 710 of screen space 700 is controlled by App. 2. Application windows 701 and 702 are pushed off screen space 700, such that application window 703 replaces application windows 702 and 701 on screen space 700. In one embodiment, user interface 706 and user interface 707 continue to be displayed after removing application windows 701 and 702, as shown in FIG. 7C. In one embodiment, Application App.1, whose application windows 701 and 702 have been removed from screen space 700 and replaced by application window 703 of App.2, continues to be executed by the processor of the data processing system and is identified by text App.1, or an icon, on user interface 706, as shown in FIG. 7B.

FIG. 8 shows one embodiment of a method 800 of manipulating a screen space of a display device. Method 800 begins with operation 801 which involves displaying multiple windows on a screen space, wherein each of the windows is controlled by a separate application and displaying a user interface of one or more system level applications, e.g., a dock, which show icons of system level applications, as described above with respect to FIGS. 5A and 7A.

Next, operation 802 involves receiving a selection of a single application mode. In one embodiment, selection of a single application mode may be performed by selecting a command to enter a single application mode, as described above. Method 800 continues with operation 803 that involves removing automatically, without a user's intervention other than the selection of single application mode, all the windows from the screen space, except a first application window, in response the selection. Typically, the selection of such mode also includes selecting the single application which is to be run in this mode. This may occur by, for example, causing the presentation of a contextual menu for the desired application and selecting single application mode from that menu. More specifically, a user may position a cursor over an icon, representing the desired application, in the dock and press a button to cause the display of the contextual menu which includes a command which, if selected from the contextual menu, causes the selection of a single application mode in which the windows of the desired application are displayed (and other formerly opened windows of other user level applications are closed in response to the selection). Next, operation 804 may be optionally performed and it involves continuing to display the user interface of the system level application, as described above with respect to FIGS. 5B and 7B. The user interface of the system level application is continued to be displayed in a single application mode, as described above. The user interface of the system level application may be an icon, a bar, a command tab interface, a dashboard, a taskbar, a menu bar, and the like. Next, operation 805 is optionally performed and it involves displaying the user interface, e.g., icons, of user level applications, which windows are removed from the screen space, wherein the user level applications are executing. Next, a request to display a second application window is received in operation 806. The request is received during a single application mode that includes controlling a major portion of a screen space by a single application, as described above with respect to FIGS. 4 and 5B. Next, method continues with operation 807 that involves displaying, in response to receiving the request, the second application window on the screen space, while removing the first application window form the screen space. Displaying the second application window while removing the first application window is performed in a single application mode, as described above. In one embodiment, the first application window is pushed off the screen space, and second application window is displayed on the screen replacing the first application window. In one embodiment, the first user application, whose application window has been removed from the screen space, continues to be executed by the processor.

Figure 9:
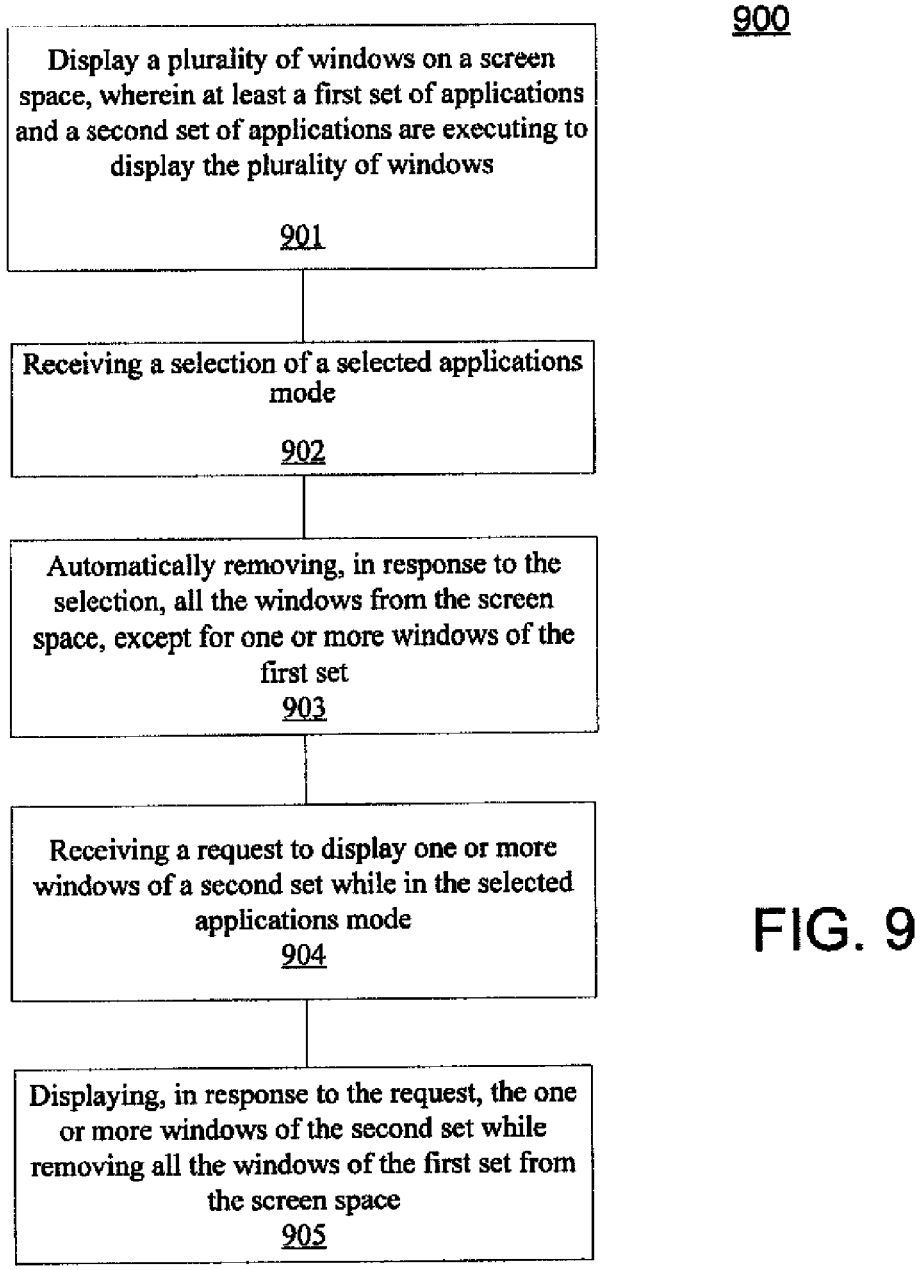
FIG. 9 is a flowchart which shows another exemplary embodiment of the invention.

FIG. 9 shows another embodiment of a method 900 of manipulating a screen space of a display device. This embodiment allows a user to select at least one set of applications (e.g. a word processing applications and a web browser application) which can be displayed concurrently while other applications' windows are removed from the display's screen when "single" application mode is selected. In this example, the mode may be characterized as "selected applications mode" because multiple applications may be selected to cause their windows to appear while other non-selected applications will have their windows removed. This may be extended to several sets of selected applications, each of which may be caused to appear while removing windows of applications not in the set which has been selected for display. Method 900 begins with operation 901 which involves displaying multiple windows on a screen space, wherein at least a first set of applications and a second set of applications are executing to display the windows. Next, operation 902 involves receiving a selection of a selected applications ("Single App") mode. In one embodiment, selection of a Single App mode may be performed by selecting a command to enter the Single App mode. Method 900 continues with operation 903 that involves removing automatically, without a user's intervention other than the selection of the Single App mode, all the windows from the screen space, except for one or more windows of the first set, in response the selection. Typically, the selection of such mode also includes selecting, e.g., by marking, a set of applications which is to be run in the selected applications mode. This may occur by, for example, displaying a contextual menu for each desired application, indicating that the desired application needs to be included in the desired set, and selecting selected applications mode using that menu. More specifically, a user may position a cursor over an icon, representing the desired application of the set, in the dock and press a button to cause the display of the contextual menu which includes a command which, if selected from the contextual menu, causes the selection of a selected applications mode in which one or more windows of the desired set of applications are displayed while all other formerly opened windows of other user level applications are automatically removed from the screen space in response to the selection, as described in operation 903. In one embodiment, one or more other applications (e.g., user level applications) may be marked to not to be affected by the selection of the Single App mode and to continue to be displayed while in the Single App mode. In one embodiment, a user interface of the system level application is continued to be displayed in a Single App mode, as described above. The user interface of the system level application may be an icon, a bar, a command tab interface, a dashboard, a taskbar, a menu bar, and the like. In one embodiment, a user interface, e.g., icons, of user level applications, whose windows are removed from the screen space, wherein the user level applications are executing, continues to be displayed in a dock or portion of a screen. Next, a request to display one or more windows of a second set of applications is received in operation 904. The request is received during the Single App mode that includes controlling a major portion of a screen space by a single set of applications. Next, method continues with operation 905 that involves displaying, in response to receiving the request, the one or more windows of the second set of applications on the screen space, while removing all the windows of the first set of applications form the screen space. Displaying the one or more windows of the second set of applications while removing all the windows of the first set of applications is performed in a Single App mode. In one embodiment, the windows of the first set of applications are pushed off the screen space, and the one or more windows of the second set of applications are displayed on the screen replacing the first application window. In one embodiment, the set of applications, whose windows have been removed from the screen space, continues to be executed by the processor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-readable storage medium storing executable program instruction which when executed by a data processing system causes the system to perform operations, comprising:

displaying a plurality of windows on a screen space of a display device, wherein at least a first set of applications and a second set of applications are being executed to display the plurality of windows;

displaying a user interface including an icon for each of the applications in the first set and the second set of applications, wherein the user interface floats on the screen space;

receiving a selection of a selected application mode for the first set of applications;

automatically removing, in response to the selection of the selected application mode for the first set of applications, all the windows associated with the second set of applications from the screen space of the display device, except for one or more windows associated with the first set of applications, wherein the second set of applications continues to be executed;

receiving a request to display one or more windows associated with the second set of applications while in the selected application mode; and automatically replacing, in response to the receiving the request, all the windows associated with the first set of applications with the one or more windows associated with the second set of applications on the screen space of the display device, wherein the first set of applications continues to be executed.

2. A machine-readable medium as in claim 1, wherein the first set of applications is a single application and the second set of applications is a single application.

3. A machine-readable medium as in claim 1, wherein:
the first set of applications is either a set of user level applications or a set of system level applications; and
the second set of applications is either a set of user level applications or a set of system level applications.

4. A machine-readable medium as in claim 1, further comprising instructions that cause the system to perform operations comprising:
continuing to display the user interface after the automatically removing the all the windows from the screen space of the display device, except for the one or more windows associated with the first set of applications, wherein the user interface includes an icon for one or more of the set of applications that are being currently executed.

5. A machine-readable medium as in claim 1, further comprising instructions that cause the system to perform operations comprising:
displaying in the user interface live representations of the set of applications that continues to execute after its associated windows have been removed from the screen space of the display device.

6. A machine-readable medium as in claim 1, further comprising instructions that cause the system to perform operations comprising:
marking the first set of applications to be displayed in the selected application mode; and
marking the second set of applications to be displayed in the selected application mode.

7. A machine readable medium as in claim 1, wherein the selected application mode includes controlling a major portion of the screen space of the display device by one of the first set and the second set of applications.

8. A machine-readable medium as in claim 1, wherein after the replacing, a content of the one or more windows associated with the second set of the applications remains in the frame buffer while the content of all the replaced windows are no longer in the frame buffer.

9. A method, comprising:
displaying a plurality of windows on a screen space of a display device, wherein at least a first set of applications and a second set of applications are being executed to display the plurality of windows;
displaying a user interface including an icon for each of the applications in the first set and the second set of applications, wherein the user interface floats on the screen space;
receiving a selection of a selected application mode for the first set of applications;
automatically removing, in response to the selection of the selected application mode for the first set of applications, all the windows associated with the second set of applications from the screen space of the display device, except for one or more windows associated with the first set of applications, wherein the second set of applications continues to be executed;

receiving a request to display one or more windows associated with the second set of applications while in the selected application mode; and automatically replacing, in response to the receiving the request, all the windows associated with the first set of applications with the one or more windows associated with the second set of applications on the screen space of the display device, wherein the first set of applications continues to be executed.

10. A method as in claim 9, wherein the first set of applications is a single application and the second set of applications is a single application.

11. A method as in claim 9, wherein:
the first set of applications is either a set of user level applications or a set of system level applications; and
the second set of applications is either a set of user level applications or a set of system level applications.

12. A method as in claim 9, further comprising:
continuing to display the user interface after the automatically removing the all the windows from the screen space of the display device, except for the one or more windows associated with the first set of applications, wherein the user interface includes an icon for one or more of the set of applications that are being currently executed.

13. A method as in claim 9, further comprising:
displaying in the user interface live representations of the set of applications that continues to execute after its associated windows have been removed from the screen space of the display device.

14. A method as in claim 9, further comprising:
marking the first set of applications to be displayed in the selected application mode; and
marking the second set of applications to be displayed in the selected application mode.

15. A method as in claim 9, wherein the selected application mode includes controlling a major portion of the screen space of the display device by one of the first set and the second set of applications.

16. A method as in claim 9, wherein after the replacing, a content of the one or more windows associated with the second set of the applications remains in the frame buffer while the content of all the replaced windows are no longer in the frame buffer.

17. A data processing system, comprising:
a memory; and
a processor coupled to the memory, wherein the processor is configured to display a plurality of windows on a screen space of a display device, wherein at least a first set of applications and a second set of applications are being executed to display the plurality of windows; the processor is configured to display a user interface including an icon for each of the applications in the first set and the second set of system applications, wherein the user interface floats on the screen space; the processor is configured to receive a selection of a selected application mode for the first set of applications; the processor is configured to automatically remove, in response to the selection of the selected application mode for the first set of applications, all the windows associated with the second set of applications from the screen space of the display device, except for one or more windows associated with the first set of applications, wherein the second set of applications continues to be executed; the processor is configured to receive a request to display one or more windows associated with the second set of applications while in the selected application mode; and the processor is configured to automatically replace, in response to the receiving the request, all the windows associated with the first set of applications with the one or more windows associated with the second set of applications on the screen space of the display device, wherein the first set of applications continues to be executed.

18. A data processing system as in claim 17, wherein the first set of applications is a single application and the second set of applications is a single application.

19. A data processing system as in claim 17, wherein:

the first set of applications is either a set of user level applications or a set of system level applications; and the second set of applications is either a set of user level applications or a set of system level applications.

20. A data processing system as in claim 17, wherein the processor is further configured to continue to display the user interface after the automatically removing the all the windows from the screen space of the display device, except for the one or more windows associated with the first set of applications, wherein the user interface includes an icon for one or more of the set of applications that are being currently executed.

21. A data processing system as in claim 17, wherein the processor is further configured to display in the user interface live representations of the set of applications that continues to execute after its associated windows have been removed from the screen space of the display device.

22. A data processing system as in claim 17, wherein the processor is further configured to:

mark the first set of applications to be displayed in the selected application mode; and mark the second set of applications to be displayed in the selected application mode.

23. A data processing system as in claim 17, wherein in the selected application mode the processor is configured to control a major portion of the screen space of the display device by one of the first set and the second set of applications.

24. A data processing system as in claim 17, wherein after the replacing, a content of the one or more windows associated with the second set of the applications remains in the frame buffer while the content of all the replaced windows are no longer in the frame buffer.

* * * * *

UNITED STATES PATENT AND TRADEMARK OFFICE
CERTIFICATE OF CORRECTION

PATENT NO.        : 8,319,795 B2  
APPLICATION NO.   : 13/268186  
DATED             : November 27, 2012  
INVENTOR(S)       : John Louch Page 1 of 1

It is certified that error appears in the above-identified patent and that said Letters Patent is hereby corrected as shown below:

In column 15, line 23, in Claim 4, before "all", delete "the", therefor

In column 16, line 22, in Claim 12, before "all", delete "the", therefor

In column 16, line 53, in Claim 17, after "windows;", insert --¶--, therefor

In column 16, line 57, in Claim 17, after "space;", insert --¶--, therefor

In column 16, line 59, in Claim 17, after "applications;", insert --¶--, therefor In column 16, line 67, in Claim 17, after "executed;", insert --¶--, therefor In column 17, line 3, in Claim 17, after "mode; and", insert --¶--, therefor In column 17, line 20, in Claim 20, before "all", delete "the", therefor Signed and Sealed this  
Nineteenth Day of March, 2013

Teresa Stanek Rea  
*Acting Director of the United States Patent and Trademark Office*